(12) United States Patent
Stauder et al.

(10) Patent No.: US 11,044,409 B2
(45) Date of Patent: Jun. 22, 2021

(54) METHOD AND DEVICE FOR ESTIMATING CAST SHADOW REGIONS AND/OR HIGHLIGHT REGIONS IN IMAGES

(71) Applicant: INTERDIGITAL CE PATENT HOLDINGS, Paris (FR)

(72) Inventors: Jurgen Stauder, Montreuil/Ille (FR); Philippe Robert, Rennes (FR); David Gendron, Chevaigne (FR)

(73) Assignee: INTERDIGITAL MADISON PATENT HOLDINGS, SAS, Paris (FR)

(\*) Notice: Subject to any disclaimer, the term of this patent is extended or adjusted under 35 U.S.C. 154(b) by 0 days.

(21) Appl. No.: 16/347,439

(22) PCT Filed: Oct. 26, 2017

(86) PCT No.: PCT/EP2017/077401
§ 371 (c)(1),
(2) Date: May 3, 2019

(87) PCT Pub. No.: WO2018/082996
PCT Pub. Date: May 11, 2018

(65) Prior Publication Data
US 2019/0281201 A1 Sep. 12, 2019

(30) Foreign Application Priority Data
Nov. 3, 2016 (EP) .................. 16306441

(51) Int. Cl.
*H04N 5/235* (2006.01)
*G06T 5/00* (2006.01)
(Continued)

(52) U.S. Cl.
CPC ......... *H04N 5/235* (2013.01); *G06K 9/00664* (2013.01); *G06K 9/4661* (2013.01);
(Continued)

(58) Field of Classification Search
None
See application file for complete search history.

(56) References Cited

U.S. PATENT DOCUMENTS

| 5,224,178 A | 6/1993 | Madden et al. |
| 5,235,434 A | 8/1993 | Wober |

(Continued)

FOREIGN PATENT DOCUMENTS

| JP | 201234340 | 2/2012 |
| JP | 201457189 | 3/2014 |
| WO | WO2009015483 | 2/2009 |

OTHER PUBLICATIONS

Jachnik et al., "Real-Time Surface Light-field Capture for Augmentation of Planar Specular Surfaces", 2012 IEEE International Symposium on Mixed and Augmented Reality (ISMAR '12), Atlanta, Georgia, USA, Nov. 5, 2012, pp. 91-97.

(Continued)

*Primary Examiner* — Cynthia Segura
(74) *Attorney, Agent, or Firm* — Robert D. Shedd

(57) ABSTRACT

The present invention relates to a method for estimating cast shadow regions and highlight regions in a scene, said scene being represented by a low dynamic range image, called LDR image, and a high dynamic range, called HDR image, said method comprising the steps of: —computing (S1) a detail map, called LDR detail map, of the LDR image, said LDR detail map associating a detail level to each pixel of the LDR image, —computing (S2) a detail map, called HDR detail map, of the HDR image, said HDR detail map associating a detail level to each pixel of the HDR image, and —detecting (S3) regions of the scene where the detail level in the HDR detail map is greater than the detail level in the LDR detail map, said detected regions corresponding to cast shadow regions or highlights region of the scene.

15 Claims, 4 Drawing Sheets

(51) Int. Cl.
  G06T 5/50 (2006.01)
  G06K 9/00 (2006.01)
  G06K 9/46 (2006.01)

(52) U.S. Cl.
  CPC .............. G06T 5/002 (2013.01); G06T 5/007 (2013.01); G06T 5/50 (2013.01); H04N 5/2355 (2013.01); *G06T 2207/20224* (2013.01)

(56) References Cited

U.S. PATENT DOCUMENTS

| | | | |
|---|---|---|---|
| 5,828,793 | A | 10/1998 | Mann |
| 8,207,931 | B2* | 6/2012 | Zhang .................. G09G 3/3426 345/102 |
| 9,613,408 | B2* | 4/2017 | Micovic ............... H04N 5/2355 |
| 9,697,592 | B1* | 7/2017 | Dai .......................... G06T 5/009 |
| 9,800,796 | B1* | 10/2017 | Zhang ...................... G06K 9/22 |
| 10,055,872 | B2* | 8/2018 | Cao ............................ G06T 7/90 |
| 10,334,270 | B2* | 6/2019 | Boitard .................. H04N 19/36 |
| 2006/0008171 | A1* | 1/2006 | Petschnigg ............... G06T 5/50 382/254 |
| 2008/0159646 | A1* | 7/2008 | Katagiri .................. H04N 5/20 382/266 |
| 2011/0254976 | A1* | 10/2011 | Garten .................. G06F 3/1454 348/229.1 |
| 2012/0008015 | A1 | 1/2012 | Manabe |
| 2012/0306906 | A1 | 12/2012 | Johnson et al. |
| 2013/0121572 | A1 | 5/2013 | Paris et al. |
| 2015/0221280 | A1* | 8/2015 | Van Der Vleuten .... G06T 5/002 382/167 |
| 2016/0358319 | A1* | 12/2016 | Xu ........................ H04N 1/4072 |
| 2017/0134745 | A1* | 5/2017 | Boitard ................ H04N 19/521 |
| 2017/0180734 | A1* | 6/2017 | Su .......................... H04N 19/30 |
| 2017/0264839 | A1* | 9/2017 | Uvarov .............. H04N 5/35581 |
| 2017/0316553 | A1* | 11/2017 | Luka ....................... G06T 5/005 |
| 2018/0130188 | A1* | 5/2018 | Farrell ..................... G06T 7/90 |
| 2018/0253834 | A1* | 9/2018 | Pouli ....................... G06T 5/007 |
| 2018/0262769 | A1* | 9/2018 | Su .......................... H04N 19/30 |
| 2018/0336670 | A1* | 11/2018 | Onuki ..................... G06T 5/009 |

OTHER PUBLICATIONS

Yang et al., "Separating Specular and Diffuse Reflection Components in the HSI Color Space", 2013 IEEE International Conference on Computer Vision Workshops (ICCVW), Sydney, Australia, Dec. 2, 2013, pp. 891-898.

Panagopoulos et al., "Illumination Estimation and Cast Shadow Detection through a Higher-order Graphical Model", 2011 IEEE Conference on Computer Vision and Pattern Recognition (CVPR), Colorado Springs, Colorado, USA, Jun. 20, 2011, pp. 673-680.

Shor et al., "The Shadow Meets the Mask: Pyramid-Based Shadow Removal", Computer Graphics Forum Journal (Eurographics 2008), vol. 27, No. 2, Apr. 24, 2008, 10 pages.

Ortiz et al., "Automatic Detection and Elimination of Specular Reflectance in Color images by Means of MS Diagram and Vector Connected Filters", IEEE Transactions on Systems, Man, and Cybernetics—Part C (Applications and Reviews), vol. 36, No. 5, Sep. 2006, pp. 681-687.

* cited by examiner

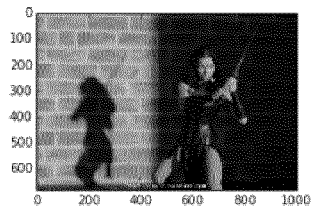 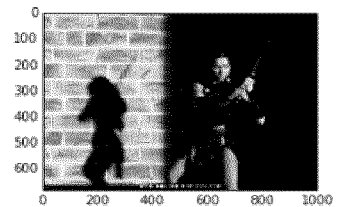 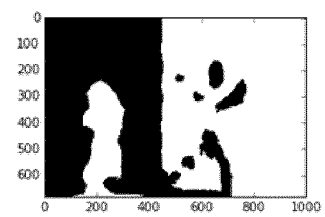
HDR  LDR  Detected shadows
FIG.4A  FIG.4B  FIG.4C
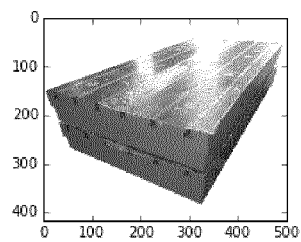 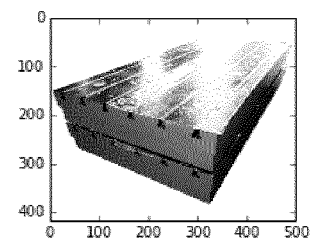 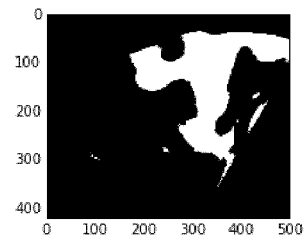
HDR  LDR  Detected highlights
FIG.5A  FIG.5B  FIG.5C

METHOD AND DEVICE FOR ESTIMATING CAST SHADOW REGIONS AND/OR HIGHLIGHT REGIONS IN IMAGES

This application claims the benefit under 35 U.S.C. § 365 of International Application PCT/EP2017/077401, filed Oct. 26, 2017, which was published in accordance with PCT Article 21(2) on May 11, 2018, in English, and which claims the benefit of European Patent Application No. 16306441.3 filed Nov. 3, 2016.

1. TECHNICAL FIELD

The present invention relates generally to the field of image processing for estimating cast shadow regions and/or highlight regions in images.

2. BACKGROUND ART

A camera transforms a light stimulus into color coordinates. More precisely, the spectrum of incident light is weighted by color filters integrated by the camera sensor resulting into color coordinates RGB for red, green and blue.

A problem in various fields of image processing is image analysis. A specific type of information to be estimated from image analysis is highlights and cast shadows. Highlights are bright image regions resulting for instance from specular reflection. Specular reflection often leads within the highlight regions to clipping of color coordinates at their maximum legal level because of the large amount of incoming light. For example, if the range of color coordinates is from 0 to 255 like, as in a LDR (for Low Dynamic Range) image or a SDR (for Standard Dynamic Range) image, color coordinates in highlight regions of are often clipped to 255 or at least strongly dynamically compressed into values close to 255. Another type of clipping is soft-clipping where a large range of light intensity values, for example from 1000 $Cd/m^2$ is mapped or soft-clipped into a small range of code values or color coordinates, for example from 250 to 255. Hereby details in light distribution, such as texture of glossy objects, loose quality. The same highlight regions of specular reflections are generally better represented in a HDR (for High Dynamic Range) image in the sense that the color coordinates of these regions are spread in a plurality of code levels or color coordinates and not only one or few code levels.

Cast shadows occur if a first object hinders light of a light source to reach a second object. Cast shadows on this second object are often much darker than the surrounding scene and lead to image regions with very small color coordinates. Color coordinates may even be clipped to zero or being dynamically strongly compressed to values close to zero.

The problem of detection of highlight regions and/or cast shadow regions in images has been addressed by a large number of well-known methods. These methods are applied on either LDR (for Low Dynamic Range) images or HDR (for high Dynamic Range) images.

For example, methods for estimating cast shadows are disclosed in "*The Shadow meets the Mask: Pyramid-Based Shadow Removal*", Y. Shor & D. Lischinski, Eurographics 2008, and in "*Illumination Estimation and Cast Shadow Detection through a Higher-order Graphical Model*", A. Panagopoulos et al., CVPR 2011.

Likewise, methods for estimating highlights are disclosed in "*Automatic detection and elimination of specular reflectance in color images by means of ms diagram and vector connected filters*", F Ortiz and F Torres, IEEE Transactions on Systems Man and Cybernetics Part C Applications and Reviews, 36(5):681-687, 2006 and in "*Real-Time Surface Light-field Capture for Augmentation of Planar Specular Surfaces*", J. Jachnik et al., ISMAR 2012.

Such methods are generally complex to implement and/or requires a plurality of images and/or uses complicated models or operations. Such methods are not able to exploit information from different dynamic range levels, for example information from SDR and HDR images, at the same time.

3. SUMMARY OF INVENTION

The method according to the invention is an alternative to these known methods.

The invention exploits the fact that the video sequences are and will be increasingly broadcasted simultaneously in at least two versions, one LDR (Low Dynamic Range) version and one HDR (High Dynamic Range) version. These versions can be present in a same video flow, for example a multilayered video flow. The display device receiving these two versions will select the version to be displayed according to its capacity to display HDR or LDR images.

The invention exploits the fact that, when two versions of a same video sequence are available, the presence of these two versions can be used for detecting cast shadows and/or highlights in the images of the video sequence. The cast shadows (very small amount of light) and the highlights (very large amount of light) are represented differently in a HDR image and a LDR image. The detail level, such as the amount, the quality or the resolution of spatio-temporal image details, of the cast shadows or highlights is higher in the HDR images than in LDR images. The invention exploits this difference of detail level between the HDR image and the LDR image to identify the cast shadows regions and the highlights regions.

So the invention relates to a method for estimating cast shadow regions or highlight regions in a scene, said scene being represented by a low dynamic range image, called LDR image, and a high dynamic range image, called HDR image, said method comprising the steps of:

computing a detail map, called LDR detail map, of the LDR image, said LDR detail map associating a detail level to each pixel of the LDR image, computing a detail map, called HDR detail map, of the HDR image, said HDR detail map associating a detail level to each pixel of the HDR image, and detecting regions of the scene where the detail level in the HDR detail map is greater than the detail level in the LDR detail map, said detected regions corresponding to cast shadow regions or highlights region of the scene.

The HDR image has a dynamic range which is higher that the LDR image. The HDR image can be built from a series of LDR images. The HDR image can be obtained from an inverse tone mapping of the LDR image. The HDR image and the LDR image can be provided independently one from the other.

Note that a LDR image and a HDR image representing a same scene can be generated automatically by appropriate known software.

A detail map of an image represents a high-frequency layer of an image and/or corresponds to fine details of this image.

Note that US2011/245976 discloses a method to detect ghosts in a HDR image built from a series of K LDR images captured under different exposures and to remove these ghosts from this HDR image. Such ghosts are created by movement between images of this series. According to [00107] of this document, these ghosts are detected through computing a variance map of luminance values over the K images of the series. In an improvement of this method disclosed at the end of paragraph [0108] of this document, ghosts residuals are detected by subtracting one image of the series, taken as a reference image, from this HDR image. Nowhere is disclosed a difference between the variance map of the HDR image and another map.

In a particular embodiment, the method further comprises a step for discriminating the cast shadow regions from the highlight regions. In this embodiment, the method further comprises the step of assigning, among the detected regions, as highlight regions, the regions in which the pixels of the LDR image or HDR image have luminance values greater than a luminance threshold and, as cast shadow regions, the regions in which the pixels of said LDR image or HDR image have luminance values lower than said luminance threshold.

The luminance threshold is for example equal to 128 for a LDR image having 8 bit color coordinates.

In a particular embodiment, the regions of the scene where the detail level in the HDR detail map is greater than the detail level in the LDR detail map are detected by calculating the difference between the HDR detail map and LDR detail map.

In a particular embodiment, the LDR detail map is computed by:
  defining a luminance value for each pixel of the LDR image in order to obtain a luminance map for the LDR image,
  applying a low pass filter to the luminance map of the LDR image in order to obtain a filtered luminance map, and
  computing a difference between the luminance map and the filtered luminance map in order to obtain the LDR detail map.

For example a spatial low pass filter removes at least partially spatial image details. Therefore, the map resulting from the difference between the luminance map and the filtered luminance map is a map representative of the details of the LDR image. Another type of low pass filter may be a temporal low pass filter for filtering temporal details, for example an object that vibrates.

In another embodiment, the LDR detail map is computed in a manner known per se by contour detection, by sharpness analysis, by analysis of local distribution of colors in the LDR image, by a contrast stretching operator applied to this LDR image, or by any other known method to detect details in an image.

In a particular embodiment, the step of computing the LDR detail map further comprises applying a luminance weighting function to the LDR detail map in order to reduce the detail levels of the pixels of the LDR detail map corresponding to pixels having medium luminance values in the LDR image.

In a particular embodiment, the step of computing the LDR detail map further comprises applying a median filter to the LDR detail map in order to reduce the noise in the LDR detail map.

The HDR detail map is computed by equivalent steps applied on the HDR image.

More specifically, the HDR detail map is computed by:
  defining a luminance value for each pixel of the HDR image in order to obtain a luminance map for the HDR image,
  applying a low pass filter to the luminance map of the HDR image in order to obtain a filtered luminance map, and
  computing a difference between the luminance map and the filtered luminance map in order to obtain the HDR detail map.

In another embodiment, the HDR detail map is computed in a manner known per se by contour detection, by sharpness analysis, by analysis of local distribution of colors in the HDR image by a contrast stretching operator applied to this LDR image, or by any other known method to detect details in an image.

In a particular embodiment, the step of computing the HDR detail map further comprises applying a luminance weighting function to the HDR detail map in order to reduce the detail levels of the pixels of the HDR detail map corresponding to pixels having medium luminance values in the HDR image.

The invention also concerns an image processing method comprising the above method. Such an image processing method can be for instance dedicated to control the shadow and the shadowing of a virtual object inserted into a natural image.

The invention also concerns a device for estimating cast shadow regions and highlight regions in a scene, said scene being represented by a low dynamic range image, called LDR image, and a high dynamic range, called HDR image, said device comprising:
  means for computing a detail map, called LDR detail map, of the LDR image, said LDR detail map associating a detail level to each pixel of the LDR image;
  means for computing detail map, called HDR detail map, of the HDR image, said HDR detail map associating a detail level to each pixel of the HDR image, and
  detection means for detecting regions of the scene where the detail level in the HDR detail map is greater than the detail level in the LDR detail map, said detected regions corresponding to cast shadow regions or highlights region of the scene.

In a particular embodiment, the detection means are configured to assign, among the detected regions, as highlight regions, the regions in which the pixels of the LDR image or HDR image have luminance values greater than a luminance threshold and, as cast shadow regions, the regions in which the pixels of said LDR image or HDR image have luminance values lower than said luminance threshold.

The invention also concerns an electronic device incorporating the above device for estimating cast shadow regions and highlight regions in a scene. Preferably, this electronic device is a camera, a TV set, a monitor, a head mounted display, a set top box, a gateway, a smartphone or a tablet.

The invention also concerns a non-transitory storage medium carrying instructions of program code for executing steps of the above method, when said program is executed on a computing device.

4. BRIEF DESCRIPTION OF THE DRAWINGS

The invention can be better understood with reference to the following description and drawings, given by way of example and not limiting the scope of protection, and in which:

FIGS. 4A to 4C illustrate the results of the inventive method on images comprising cast shadow regions;

FIGS. 5A to 5C illustrate the results of the inventive method on images comprising cast shadow regions;

5. DESCRIPTION OF EMBODIMENTS

Figure 1:
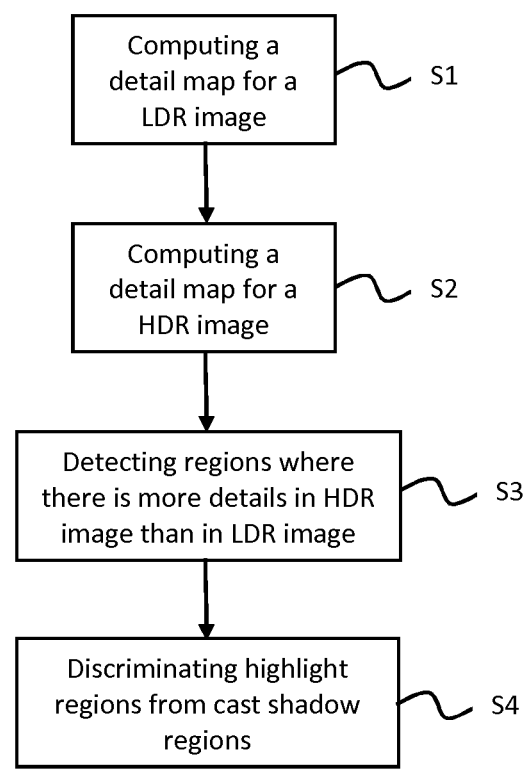
FIG. 1 is a flow chart of the successive steps of the method of the invention.

While example embodiments are capable of various modifications and alternative forms, embodiments thereof are shown by way of example in the drawings and will herein be described in details. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more details, it is noted that some example embodiments are described as processes or methods depicted as flowcharts. Although the flowcharts describe the operations as sequential processes, some of the operations may be performed in parallel, concurrently or simultaneously. In addition, the order of operations may be re-arranged. The processes may be terminated when their operations are completed, but may also have additional steps not included in the figures. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks. Specific structural and functional details disclosed herein are merely representative for purposes of describing example embodiments of the present invention. This invention may, however, be embodied in many alternate forms and should not be construed as limited to only the embodiments set forth herein.

The invention exploits the presence of at least two images, at least one LDR image and one HDR image, of a same scene in order to determine the cast shadow regions and/or the highlight regions in this scene. The HDR image designates an image having a dynamic range higher than the LDR image. The inventive method will be illustrated by using a LDR image the colors of which are represented by 8 bit color coordinates and an HDR image the colors of which are represented by 10 bit color coordinates. These color coordinates will be for example expressed in the RGB color space.

In reference to FIG. 1, the inventive method comprises the following steps:

step S1: a detail map, called LDR detail map, is generated for the LDR image; this LDR detail map assigns a detail level to each pixel of the LDR image;

step S2: a detail map, called HDR detail map, is generated for the HDR image; this HDR detail map assigns a detail level to each pixel of the HDR image.

step S3: regions of the scene where the detail level in the LDR detail map is greater than the detail level in the LDR detail map are detected; the detected regions correspond to cast shadow regions or highlights region of the scene;

step S4: the cast shadow regions are advantageously discriminated from the highlight regions.

Each one of the above-mentioned steps are described in detail hereinafter.

Figure 2:
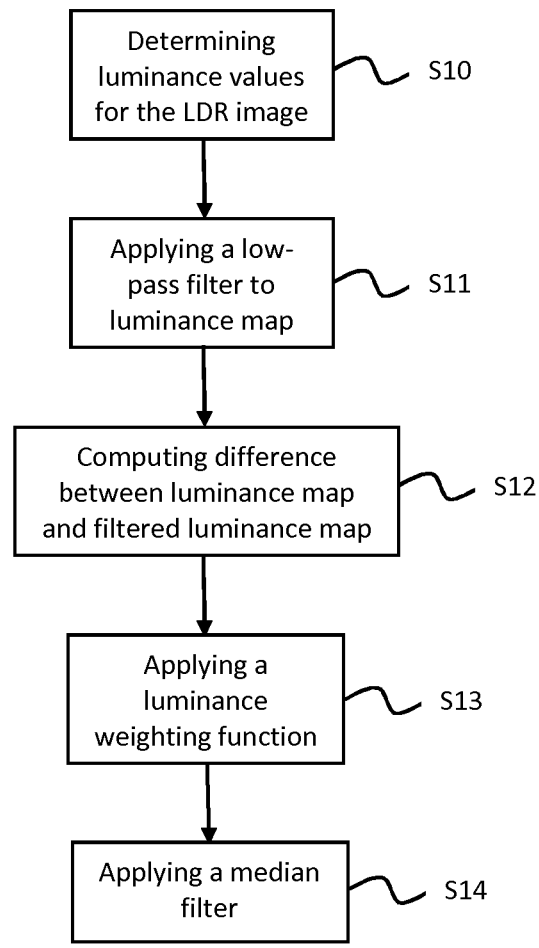
FIG. 2 is a flow chart showing the steps for computing a LDR detail map for a LDR image according to an embodiment of the invention.

FIG. 2 shows a possible implementation of the step S1. In reference to FIG. 2, the LDR detail map is computed by the following sub-steps.

In a sub-step S10, a luminance value is defined for each pixel of the LDR image in order to obtain a luminance map for the LDR image. For the present LDR image having 8 bit color coordinates in the RGB color space, the luminance Y can be calculated by the following formula:

$$Y=0.2126*R+0.7152*G+0.0722*B$$

A luminance map is thus generated for the LDR image.

In a sub-step S11, a low pass filter is applied to the luminance map of the LDR image in order to obtain a filtered luminance map. This low-pass filter is for example a well-known Gaussian low pass filter introducing blur into the image. Other low pass filters can be used, for example an averaging window, a filter in frequency domain or a FIR (Finite Impulse Response) filter.

Instead of low pass filtering and difference calculation, details could also be detected directly using for example a high pass filter or an edge detection algorithm.

In a sub-step S12, a difference is computed between the luminance map and the filtered luminance map in order to obtain the LDR detail map. This LDR detail map allocates a detail level to each pixel of the LDR image.

Figure 3:
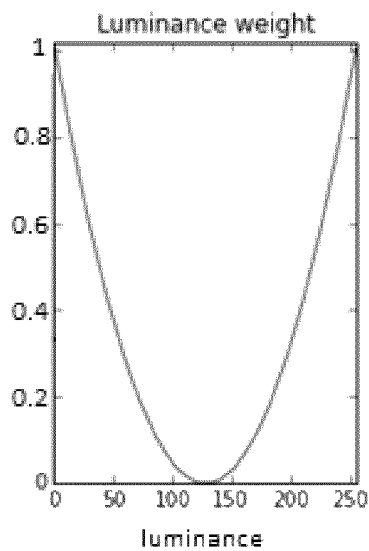
FIG. 3 is a diagram illustrating a luminance weighting function of the flow chart of FIG. 2.

In a preferred embodiment, a luminance weighting function is applied the LDR detail map in a sub-step S13. An example of weighting function is illustrated by FIG. 3. The aim of this weighting function is to remove the details that are not present in highlight or shadows regions. The weight applied to a pixel of the LDR detail map depends on the luminance value of the pixel (value of the pixel in the luminance map). In FIG. 3, the equation of the luminance weighting function, noted W(x), is $W(x)=[(Y(x)-128)/128]^2$ wherein Y(x) is the luminance value of the pixel x in the luminance map and W(x) is the weight to be applied to the detail level (in LDR detail map) of the pixel x. According to this function, the detail level of the pixels having a high or low luminance value are substantially maintained (weight close to 1) while the detail level of the pixels having a medium luminance value close to 128 are substantially decreased and even set to zero.

Of course, other weighting functions that decreases the detail level of the pixels having medium luminance values may be used.

Advantageously, in an additional sub-step, S14, the LDR detail map is filtered by a median filter in order to remove noise in the LDR map detail.

By referring again to FIG. 1, the step S2 consists the same steps than S10 to S14 to the HDR image in order to obtain a HDR detail map.

In step S3, the regions of the scene where the detail level in the HDR detail map is greater than the detail level in the LDR detail map are detected by calculating the difference between the HDR detail map and LDR detail map. More specifically, the LDR detail map is subtracted from the HDR detail map resulting in a difference map. Of course, before performing this subtraction, the detail levels of the HDR and SDR maps are preferably aligned to each other. For example, the detail levels of the HDR detail map are divided by 4 due to the difference of bit number between the LDR image (8 bits) and the HDR image (10 bits). Other types of alignment are possible such as tone mapping the HDR detail map before subtraction or to divide the HDR and the LDR maps by the level of HDR and LDR diffuse white, respectively. The regions of the difference map having positive values are regions that are likely highlights or cast shadows in the images.

In an optional step S4, the highlight regions are discriminated from the cast shadows regions based on the luminance values of the LDR image or the HDR image. For example when using the LDR image, all regions having positive values in the difference map and corresponding to pixels in the LDR image having a luminance value greater than 128 are declared as highlights regions while all regions having positive values in the difference map and corresponding to pixels in the LDR image having a luminance value lower than or equal to 127 are declared as cast shadow regions.

In a variant, when more than two dynamic range levels are available, the method can be used, too. For example when low dynamic range (LDR), medium dynamic range (MDR) and high dynamic range (HDR) images are available, the described steps S1 to S4 can be applied to LDR and MDR (instead of HDR) giving a first detection result, and then to MDR (instead of LDR) and HDR giving a second detection result. Then, the first and section detection results are combined. The combination can be realized for example using a logical AND operation such that, for example, a highlight is detected if it is contained in the first AND second detection result. Another possibility is to calculate additionally a detail map for the MDR image and then to apply step S3 to LDR and MDR (instead of HDR) giving first regions of more details and then to MDR (instead of LDR) and HDR giving second regions of more details. The first and second regions are then combined, for example using a logical OR operation such that regions of more details are defined there where there are either first or second regions of details. Then, step S4 is applied to these regions of details.

FIGS. 4A to 4C and FIGS. 5A to 5C illustrate the results of the inventive method on two couples of image.

FIGS. 4A and 4B are a HDR image and a LDR image of a scene comprising cast shadows regions. FIG. 4C shows the cast shadow regions (white pixels) detected by the inventive method.

FIGS. 5A and 5B are a HDR image and a LDR image of a scene comprising highlight regions. FIG. 4C shows the highlight regions (white pixels) detected by the inventive method.

Figure 6:
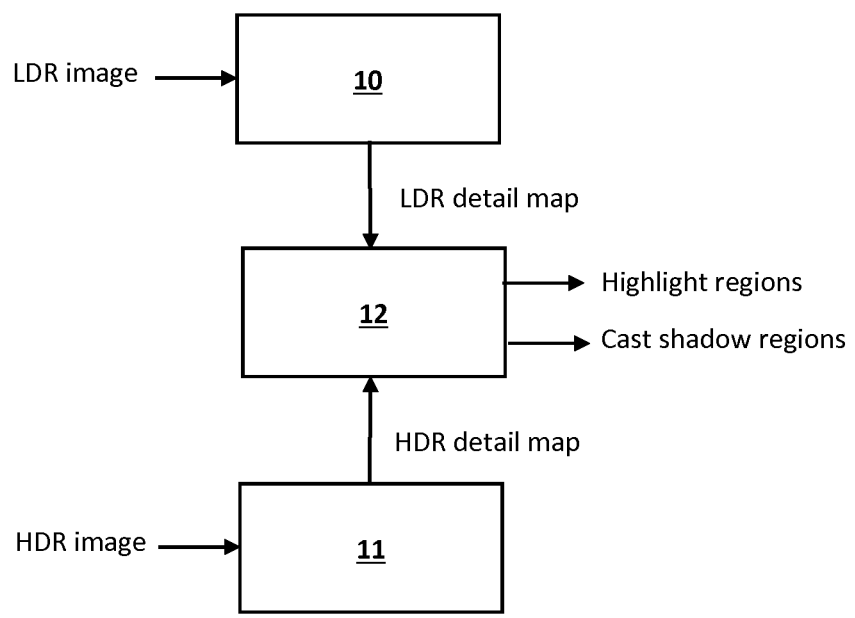
FIG. 6 is a schematic view of a device implementing the inventive method.

An example of device implementing this method is given in FIG. 6. In reference to FIG. 6, the device comprises:
computer means 10 for computing the LDR detail map as described in step S1,
computer means 11 for computing the HDR detail map as described, and
detection means 12 for detecting regions of the scene where the detail level in the HDR detail map is greater than the detail level in the LDR detail map and for discriminating the highlight regions from the cast shadow regions as described in steps S3 and S4.

The advantages of the method according to the invention are the following ones:
it is able to exploit information from different dynamic range levels from SDR and HDR images at the same time, and thus exploiting a new type of information for highlight and shadow detection;
it requires only two images having different dynamic ranges; these two required images are largely available in distribution of layered HDR content;
the method works only on luminance values and is thus less complex than methods working on color coordinates; and
the method is simple to implement.

Although some embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A method for detecting cast shadow regions and highlight regions in a scene, said scene being represented by a low dynamic range image, called LDR image, and a high dynamic range image, called HDR image, the HDR image having a dynamic range higher than the LDR image, said method comprising the steps of:
detecting regions in said scene having a positive difference between a HDR high-frequency layer computed from said HDR image and a LDR high-frequency layer computed from said LDR image, said detected regions having said positive difference corresponding to cast shadow regions or highlights region of the scene.

2. The method according to claim 1, wherein said computing of said LDR high-frequency layer is based on a LDR difference between a luminance map of said LDR image and a filtered luminance map of said LDR image and wherein said computing of said HDR high-frequency layer is based on a HDR difference between a luminance map of said HDR image and a filtered luminance map of said HDR image.

3. The method according to claim 2, wherein said filtered luminance map of said LDR image is obtained by applying a low pass filter to the luminance map of the LDR image.

4. The method according to claim 2, wherein the step of computing the LDR high-frequency layer further comprises applying a luminance weighting function to the LDR difference.

5. The method according to claim 2, wherein said filtered luminance map of said HDR image is obtained by applying a low pass filter to the luminance map of the HDR image.

6. The method according to claim 2, wherein the step of computing the HDR high-frequency layer further comprises applying a luminance weighting function to the HDR difference.

7. The method according to claim 1, wherein it further comprises the step of assigning, among the detected regions, as highlight regions, the regions in which the pixels of the LDR image or HDR image have luminance values greater than a luminance threshold and, as cast shadow regions, the regions in which the pixels of said LDR image or HDR image have luminance values lower than said luminance threshold.

8. An image processing method comprising the method claim 1.

9. A non-transitory storage medium carrying instructions of program code for executing steps of the method according to claim 1, when said program is executed on a computing device.

10. A device for detecting cast shadow regions and highlight regions in a scene, said scene being represented by a low dynamic range image, called LDR image, and a high dynamic range, called HDR image, the HDR image having a dynamic range higher than the LDR image, said device comprising at least one processor configured to:

detect regions in said scene having a positive difference between a HDR high-frequency layer computed from said HDR image and a LDR high-frequency layer computed from said LDR image, said detected regions having said positive difference corresponding to cast shadow regions or highlights region of the scene.

11. The device according to claim 10, wherein said at least one processor is further configured to:

compute said LDR high-frequency layer based on a LDR difference between a luminance map of said LDR image and a filtered luminance map of said LDR image; and compute said HDR high-frequency layer based on a HDR difference between a luminance map of said HDR image and a filtered luminance map of said HDR image.

12. The device according to claim 10, wherein said at least one processor is further configured to assign, among the detected regions, as highlight regions, the regions in which the pixels of the LDR image or HDR image have luminance values greater than a luminance threshold and, as cast shadow regions, the regions in which the pixels of said LDR image or HDR image have luminance values lower than said luminance threshold.

13. An image processing device incorporating the device according to claim 10.

14. An electronic device incorporating the image processing device according to claim 13.

15. The electronic device according to claim 14 selected from the group consisting of a camera, a TV set, a monitor, a head mounted display, a set top box, a gateway, a smartphone and a tablet.

\* \* \* \* \*